US012780609B2

(12) United States Patent
Zanella

(10) Patent No.: US 12,780,609 B2
(45) Date of Patent: Nov. 3, 2026

(54) COUPLING AND LOCKING DEVICE FOR SYNCHRONOUS DOORS OF AN ELEVATOR EQUIPMENT

(71) Applicant: PRISMA S.P.A., Sorbolo Mezzani (IT)

(72) Inventor: Antonio Zanella, Parma (IT)

(73) Assignee: PRISMA S.P.A., Sorbolo Mezzani (IT)

( * ) Notice: Subject to any disclaimer, the term of this patent is extended or adjusted under 35 U.S.C. 154(b) by 0 days.

(21) Appl. No.: 19/234,982

(22) Filed: Jun. 11, 2025

(65) Prior Publication Data

US 2025/0388434 A1 Dec. 25, 2025

(30) Foreign Application Priority Data

Jun. 19, 2024 (IT) ........................ 102024000014017

(51) Int. Cl.
*B66B 13/12* (2006.01)

(52) U.S. Cl.
CPC .................................... *B66B 13/12* (2013.01)

(58) Field of Classification Search
CPC .......... B66B 13/12; B66B 13/20; B66B 13/24
See application file for complete search history.

(56) References Cited

U.S. PATENT DOCUMENTS 4,947,964 A * 8/1990 Husmann ................ B66B 13/12 187/314
5,246,089 A * 9/1993 Husmann ................ B66B 13/12 49/118
5,730,254 A * 3/1998 Nguyen .................. B66B 13/12 187/334
5,819,877 A * 10/1998 Rivera .................... B66B 13/20 187/314
5,950,766 A * 9/1999 Oberleitner ............. B66B 13/12 187/319
6,021,871 A * 2/2000 Grabner .................. B66B 13/12 187/335

(Continued)

FOREIGN PATENT DOCUMENTS

CN 105 366 513 A 3/2016
CN 109 132 814 A 1/2019

(Continued)

OTHER PUBLICATIONS

Italian Search Report from Corresponding Italian Patent Application No. 202400014017, dated Dec. 2, 2024.

*Primary Examiner* — Michael A Riegelman
(74) *Attorney, Agent, or Firm* — Cooper Legal Group LLC

(57) ABSTRACT

A coupling and locking device for synchronous doors of an elevator. The device includes a pair of coupling blades movable on a base plate, a pair of rotating levers hinged to the coupling blades to form a parallelogram mechanism, and a hooking lever movable to engage a fixed component of the elevator. The hooking lever is connected to a first rotating lever by a rotor mechanism having a primary rotor rotatable around a fixed pin on the base plate, and a secondary rotor with a first connecting pin for connection to the first rotating lever and a second connecting pin for connection to the primary rotor. A third connecting pin connects the hooking lever with the secondary rotor such that movement of the coupling blades causes a rotation of the hooking lever. The secondary rotor has an arc-shaped slot, within which the third connecting pin is inserted.

16 Claims, 6 Drawing Sheets

(56) References Cited

U.S. PATENT DOCUMENTS

| | | | | |
|---|---|---|---|---|
| 6,173,815 | B1 * | 1/2001 | Mittermayr | B66B 13/12 187/319 |
| 7,077,242 | B2 * | 7/2006 | Cocher | B66B 13/24 187/333 |
| 7,100,745 | B2 * | 9/2006 | Bisang | B66B 13/12 187/335 |
| 7,252,179 | B2 * | 8/2007 | Oberleitner | B66B 13/12 187/335 |
| 7,370,731 | B2 * | 5/2008 | Cocher | B66B 13/12 187/314 |
| 9,637,350 | B2 * | 5/2017 | Mittermayr | B66B 13/12 |
| 10,040,669 | B2 * | 8/2018 | Zhang | B66B 13/12 |
| 10,207,900 | B2 * | 2/2019 | Kitazawa | B66B 13/20 |
| 10,427,914 | B2 * | 10/2019 | Zhang | B66B 13/12 |
| 12,479,701 | B2 * | 11/2025 | Chen | B66B 13/12 |
| 2005/0126861 | A1 * | 6/2005 | Bisang | B66B 13/12 187/335 |
| 2005/0139429 | A1 * | 6/2005 | Bisang | B66B 13/12 187/335 |
| 2005/0145442 | A1 * | 7/2005 | Cocher | B66B 13/24 187/333 |
| 2006/0107785 | A1 * | 5/2006 | Zappa | B66B 13/20 74/612 |
| 2006/0243535 | A1 * | 11/2006 | Kinoshita | B66B 13/20 187/319 |
| 2012/0118676 | A1 * | 5/2012 | Utsunomiya | B66B 13/12 187/330 |
| 2013/0048433 | A1 * | 2/2013 | Tantis | B66B 13/12 187/319 |
| 2015/0203329 | A1 * | 7/2015 | Zappa | B66B 11/02 187/319 |
| 2015/0329326 | A1 * | 11/2015 | Mittermayr | B66B 13/12 187/330 |
| 2016/0130116 | A1 * | 5/2016 | Kitazawa | B66B 13/18 187/335 |
| 2016/0236907 | A1 * | 8/2016 | Zhang | B66B 13/12 |
| 2017/0130486 | A1 * | 5/2017 | Zappa | E05D 15/06 |
| 2017/0217732 | A1 * | 8/2017 | Kitazawa | B66B 13/20 |
| 2018/0265332 | A1 * | 9/2018 | Zhang | B66B 13/12 |
| 2019/0084806 | A1 * | 3/2019 | Bosshart | B66B 13/30 |
| 2020/0055705 | A1 * | 2/2020 | Tracey | B66B 13/12 |
| 2024/0158206 | A1 * | 5/2024 | Chen | B66B 13/12 |
| 2025/0388434 | A1 * | 12/2025 | Zanella | B66B 13/12 |
| 2026/0008653 | A1 * | 1/2026 | Zanella | B66B 13/12 |

FOREIGN PATENT DOCUMENTS

| | | | | | |
|---|---|---|---|---|---|
| CN | 110 626 927 | A | | 12/2019 | |
| CN | 110526091 | A | * | 12/2019 | B66B 13/125 |
| CN | 111717766 | A | * | 9/2020 | B66B 5/027 |
| EP | 3564177 | B1 | * | 1/2021 | B66B 13/20 |
| EP | 4667408 | A1 | * | 12/2025 | B66B 13/12 |

* cited by examiner

COUPLING AND LOCKING DEVICE FOR SYNCHRONOUS DOORS OF AN ELEVATOR EQUIPMENT

CROSS-REFERENCE TO RELATED APPLICATION(S)

This application claims priority under 35 U.S.C. § 119 to: Italian Patent Application No.: 102024000014017, filed on 19 Jun. 2024, which is herein incorporated by reference.

BACKGROUND

The present invention generally relates to the technical field of elevator equipment, such as lifts/elevators or freight elevators. In particular, the present invention relates to a coupling and locking device for synchronous doors of an elevator equipment.

Known elevator equipment comprises a cab which is movable inside a shaft commonly called "elevator shaft". The cab, conventionally moved way by ropes or hydraulic pistons, connects at least two distinct floors of the same building to each other. A so-called "landing door", which restricts access to the elevator equipment shaft, is provided for each floor of the building. The cab is also equipped with a so-called "cab door", which normally consists of at least one panel sliding on guides. The panels sliding on their respective guides allows the cab door to be opened and closed.

In the most recent elevator equipment, both the cab door and the various landing doors are generally automatically and synchronously opened and/or closed. Apart from the cab door, in fact, each landing door also usually consists of at least one panel which slides on guides. Consequently, during normal operation of the elevator equipment, the sliding movement of the cab door panels during the opening and closing phases is synchronised with the sliding movement, during the same phases, of the panels of the door of the floor at which the cab is located. This synchronous movement allows the door of each floor to open automatically when the cab door opens when both these doors are aligned.

In case of malfunctions of the elevator equipment or when unexpected situations, such as a power outage, occur, the cab could suddenly stop between two distinct floors of the building. In this situation the cab door, because it is not aligned with any of the landing doors, obviously does not allow the automatic and synchronized opening of these landing doors which are therefore locked in the closed position.

The current European standards for the design and manufacture of elevator equipment (EN 81-20 and EN 81-50 standards) require that the cab door be equipped with at least one device designed to both allow coupling with the landing doors in the aligned configuration and blocking the cab door in the misaligned configuration. In particular, in this latter configuration, the device interacts with the cab door to prevent the panels of such door from being opened manually, from inside the cab, when the cab door and any landing door are not aligned. This requirement has been introduced to prevent the passengers inside the cab from accidentally falling into the elevator shaft when attempting to escape from the cab.

A known coupling and locking device for synchronous doors of an elevator equipment is described, for example, in prior art document CN 113291958 A. Another known coupling and locking device for synchronous doors of an elevator equipment is described, for example, in prior art document EP 3256413 A. A further known coupling and locking device for synchronous doors of an elevator equipment is described in prior art document US 2024/158206 A1, on which the preamble of claim 1 is based.

Coupling and locking devices for synchronous doors of an elevator equipment have undergone a profound modification following the EN 81-20 and EN 81-50 standards, that have come into effect from the mid-2010s. At this stage, many elevator system manufacturers have chosen the cost-effective route for their door coupling and locking devices. This is often to the detriment of the duration and precision of the coupling operation, as well as the speed of the locking operation.

The object of the present invention is, therefore, to provide a coupling and locking device for synchronous doors of an elevator equipment which is capable of solving the aforementioned drawbacks of the prior art in an extremely simple and particularly functional way.

In detail, it is an object of the present invention to provide a coupling and locking device for synchronous doors of an elevator equipment which allows for greater speed and precision of operation of the device compared to similar devices according to the prior art.

Another object of the present invention to provide a coupling and locking device for synchronous doors of an elevator equipment which is more resistant and durable than similar devices according to the prior art.

These objects according to the present invention will be achieved by providing a coupling and locking device for synchronous doors of an elevator equipment as set forth in claim 1.

Further features of the invention are highlighted by the dependent claims, which are an integral part of the present description.

BRIEF DESCRIPTION OF THE DRAWINGS

The features and advantages of a coupling and locking device for synchronous doors of an elevator equipment according to the present invention will be clearer from the following exemplifying and non-limiting description, referring to the attached schematic drawings in which.

DETAILED DESCRIPTION

Figure 1:
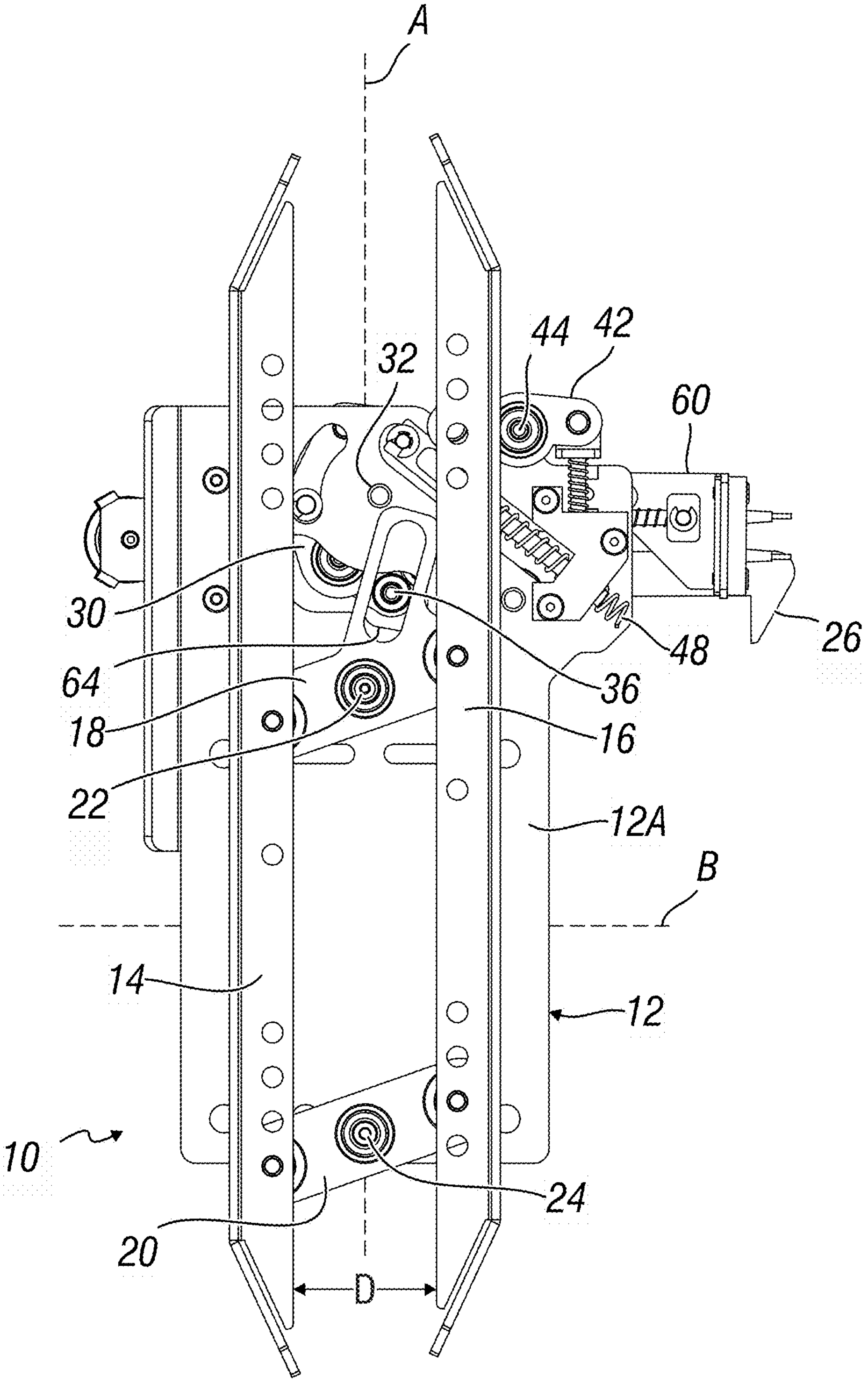
FIG. 1 is a view from the front side, or the side of the landing door, of a preferred embodiment of the coupling and locking device for synchronous doors of an elevator equipment according to the present invention.
Figure 2:
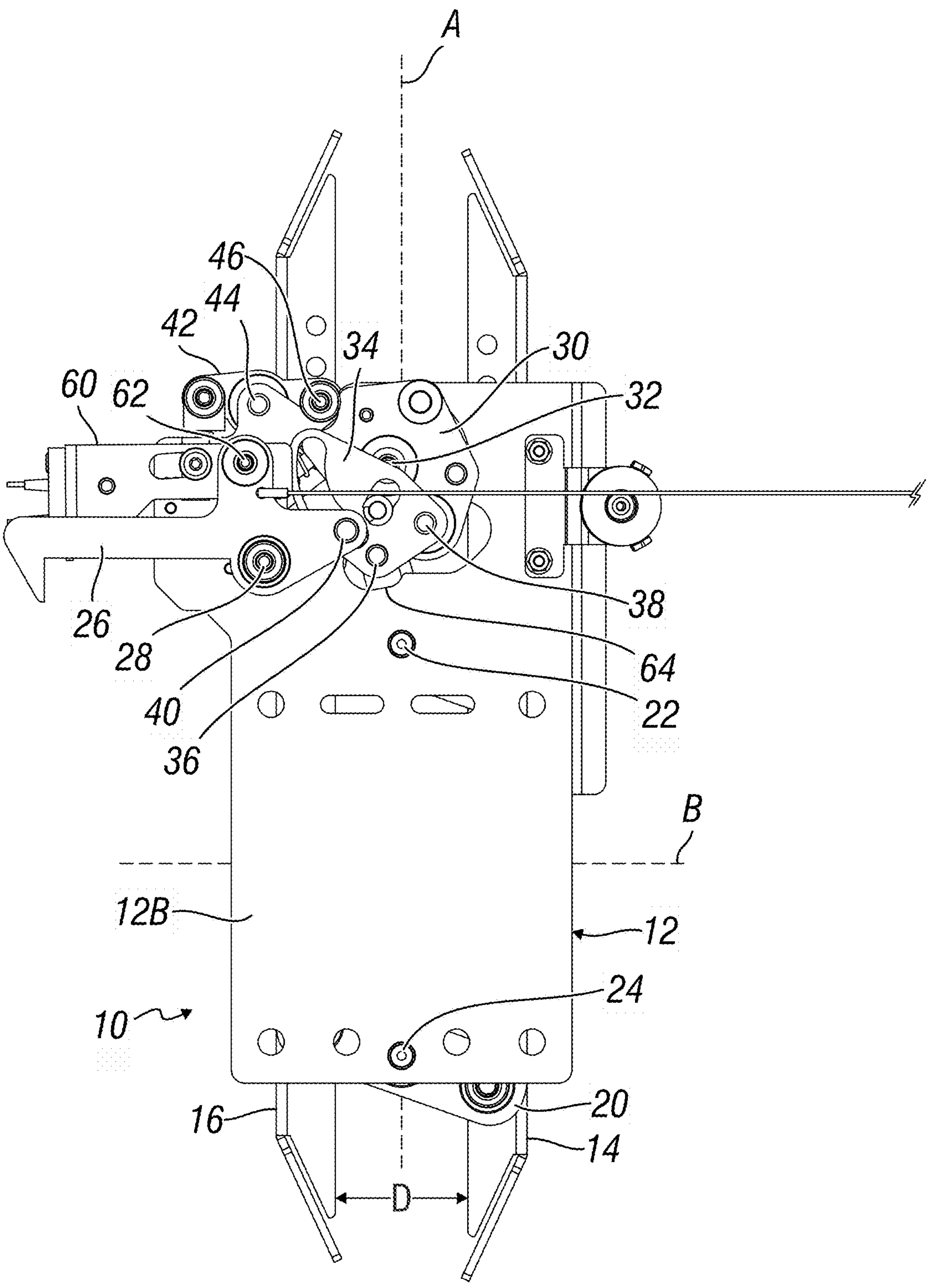
FIG. 2 is a view from the rear side, or the side of the cab, of the device of FIG. 1.
Figure 3:
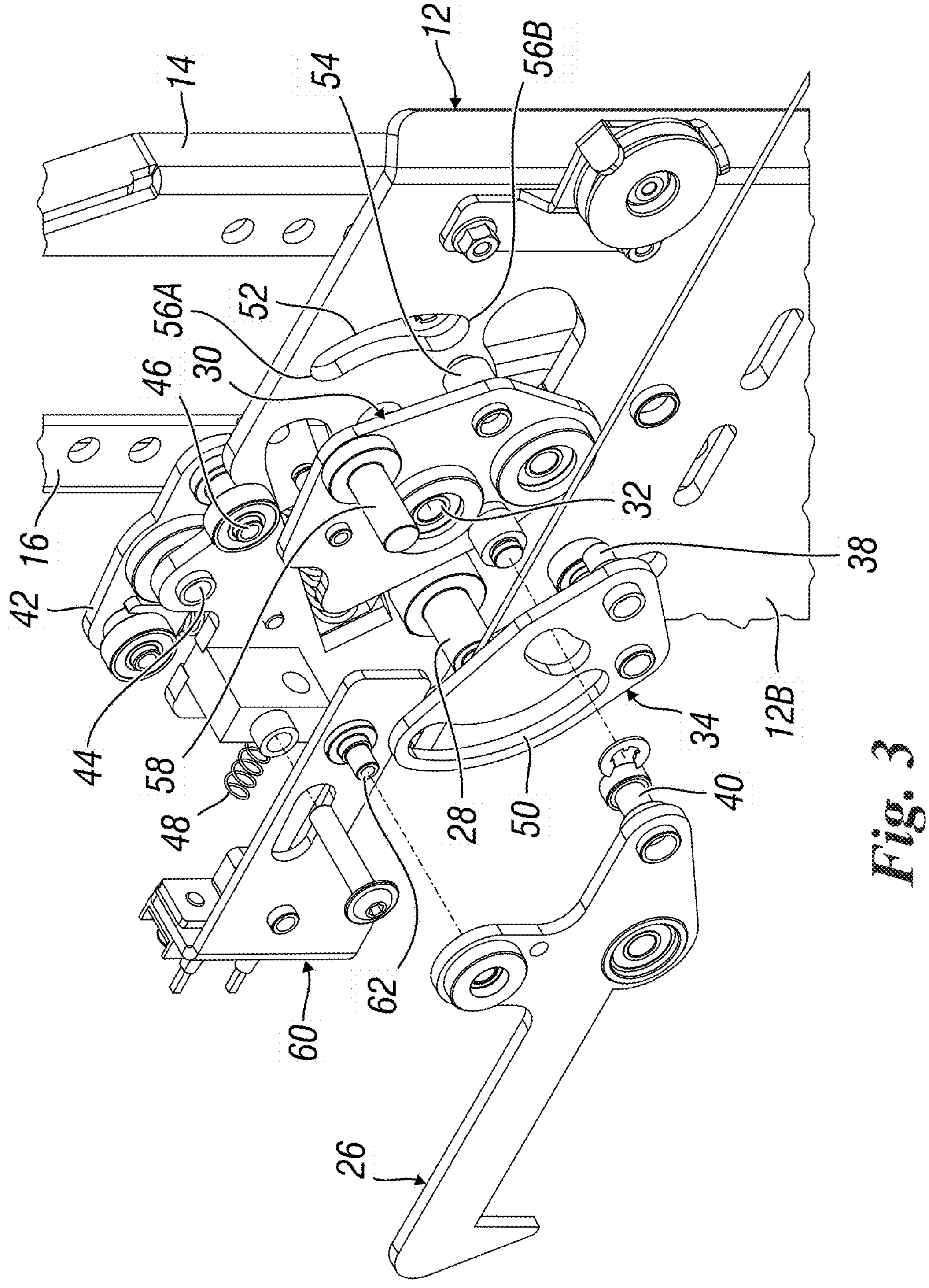
FIG. 3 is an exploded view of the main components of the device of FIG. 1.

With reference in particular to FIGS. 1 to 3, a preferred embodiment of the coupling and locking device for synchronous doors of an elevator equipment according to the present invention is shown. The coupling and locking device is indicated as a whole with the reference number 10. The device 10 is a completely mechanical device and is designed to be mounted on the automatic opening and closing mechanism of the cab door of an elevator equipment (not shown). The device 10 is therefore designed to perform the following functions:

- unlocking or locking a certain landing door depending on whether or not this landing door is aligned with the cab door of the elevator equipment;
- dragging a certain landing door in synchronization with the cab door, opening and closing the free passage;
- keeping the cab door closed in the event of an accidental off-level stop of the elevator equipment;
- enabling the cab door to open when it is aligned with a certain landing door.

The device 10 comprises a base plate 12 having a front surface 12A and a rear surface 12B. The front surface 12A is opposite and parallel to the rear surface 12B. The base plate 12 is designed to be mounted on a portion of the cab of the elevator equipment. For example, the base plate 12 can be mounted on the automatic opening and closing mechanism of the cab door of the elevator equipment.

The device 10 further comprises a first coupling blade 14 and a second coupling blade 16. These coupling blades 14, 16, which are also known as "knives", are mounted movably on the front surface 12A of the base plate 12. Each coupling blade 14, 16 can be operated by a respective actuator of the elevator equipment to move both along a first direction A and along a second direction B which is perpendicular relative to the first direction A. Generally, the first direction A is a substantially vertical direction when the device 10 is in its operating configuration, while the second direction B is a substantially horizontal direction. The actuators of the elevator equipment which operate the coupling blades 14, 16 can consist, for example and in a per se known manner, of the landing rollers which are located at a certain landing door. The movement of the coupling blades 14, 16 along the second direction B defines a variation of the mutual distance D, which is measured along the second direction B, between these coupling blades 14, 16.

The device 10 also comprises a first rotating lever 18 and a second rotating lever 20, which are both rotatable around respective fixed pins 22, 24 placed on the front surface 12A of the base plate 12. Each rotating lever 18, 20 is hinged to both the first coupling blade 14 and the second coupling blade 16 to form a parallelogram mechanism consisting of the two coupling blades 14, 16 and the two rotating levers 18, 20.

The device 10 further comprises at least one hooking lever 26, which is movable relative to the base plate 12. For example, the hooking lever 26 can be rotatable around its own fixed pin 28 placed on the rear surface 12B of the base plate 12. The hooking lever 26 is designed to engage with a respective fixed component of the elevator equipment. This fixed component can consist, for example, of a hook fasten to the cab. The hooking lever 26 is indirectly connected to the first rotating lever 18 by means of a rotor mechanism.

The rotor mechanism comprises a primary rotor 30, which is rotatable around its own fixed pin 32 placed on the base plate 12, and a secondary rotor 34. The secondary rotor 34 is equipped with a first connecting pin 36 for connection with the first rotating lever 18 and a second connecting pin 38 for connection with the primary rotor 30. A further connecting pin 40 connects the hooking lever 26 with the secondary rotor 34. The rotor mechanism is therefore configured in such a way that, in at least one of the device 10 use configuration, the variation of the distance D between the coupling blades 14, 16 causes a rotation of the hooking lever 26 thanks to the combined rotation of the primary rotor 30 and the secondary rotor 34.

The distance D between the coupling blades 14, 16 defines a nominal value of the opening between these two coupling blades 14, 16. The opening nominal value determines the change of state of the device 10, from a closed state to an open state and vice versa. In particular, if the distance D, or opening nominal value, is above a certain predefined threshold, the hooking lever 26 is in its rest condition, that is to say engaged with the hook, and the cab door will be locked. Conversely, if the distance D, or opening nominal value, is below a certain predefined threshold, the hooking lever 26 is in its operating condition, that is to say disengaged with respect to the hook, and the cab door will be unlocked.

The presence, in the rotor mechanism, of the secondary rotor 34 which rotates integral with the primary rotor 30 enhances the sensitivity and precision with which the change of state of the hooking lever 26, that is the change from the rest condition to the operating condition and vice versa, occurs. In other words, the secondary rotor 34 amplifies and speeds up the movement of the hooking lever 26 as the distance D between the two coupling blades 14, 16 varies, that is at the moment in which the 30 change of state occurs, since the change of the distance D between the two coupling blades 14, 16 determines the change of state of the hooking lever 26.

The device 10 also comprises at least one locking lever 42, which is rotatable around its own fixed pin 44 placed on the base plate 12. The locking lever 42 can be operated by a respective actuator of the elevator equipment and is equipped with its own connecting pin 46 for connection with the primary rotor 30, in such a way that a rotation of this locking lever 42 causes the selective locking and unlocking of the rotation of the primary rotor 30. Therefore, the locking lever 42 can also affect the rotation movement of the hooking lever 26, as will be better specified below.

Preferably, at least one of the fixed pins 22, 24 of the rotating levers 18, 20, the fixed pin 28 of the hooking lever 26, the fixed pin 32 of the primary rotor 30, the fixed pin 44 of the locking lever 42, the first connecting pin 36 and the second connecting pin 38 of the secondary rotor 34, the connecting pin 40 which connects the hooking lever 26 with the secondary rotor 34 and the connecting pin 46 which connects the locking lever 42 with the primary rotor 30 can be equipped with a respective rolling bearing. The presence of rolling bearings enhances the precision and speed of movement of the components of the device 10.

As shown, for example, in FIGS. 4B, 5B, 6B, 7B and 8B, the locking lever 26 is equipped with at least one spring 48. The spring 48, when not stressed, is designed to keep the hooking lever 26 in the engagement position with the respective fixed component of the elevator equipment, that is the above-mentioned hook.

As shown instead in FIG. 3, the secondary rotor 34 is equipped with a first slot 50 in the shape of an arc of a circle, within which the third connecting pin 40 which connects the hooking lever 26 with the secondary rotor 34 is inserted. A second slot 52 in the shape of an arc of a circle can also be provided, within which a connecting pin 54 which connects the primary rotor 30 with the base plate 12 is inserted. The second slot 52 comprises a first limit switch end 56A and a second limit switch end 56B, which are opposite to each other. The movement of the connecting pin 54 within the second slot 52, between the first limit switch end 56A and the second limit switch end 56B, thereby determines the value of the angle of rotation of the primary rotor 30. In the embodiment of the device 10 shown in FIGS. 1 to 3, the second slot 52 is obtained on the base plate 12, whereas the fifth connecting pin 54 is obtained on the primary rotor 30. In FIGS. 4A to 8B, which show a simplified alternative embodiment of the device 10, the second slot 52 is obtained on the primary rotor 30, whereas the fifth connecting pin 54 is obtained on the base plate 12.

The primary rotor 30 can be equipped with at least one sixth connecting pin 58 for connection with a respective actuator of the elevator equipment. For example, this actuator can consist of the drag belt that normally allows the sliding movement, during the opening and closing phases, of the cab door panels.

The device 10 can also comprise at least one movable connecting element 60 which is designed to engage with a respective connecting element of the elevator equipment. A sixth connecting pin 62 connects the movable connecting element 60 with the hooking lever 26, in such a way that the rotation of the hooking lever 26 causes a movement of the movable connecting element 60.

According to an advantageous aspect of the present invention, the base plate 12 can be equipped with at least one abutment shaped profile 64, which is designed to receive in contact the first connecting pin 36 of the secondary rotor 34 in at least one of the device 10 use configurations. This use configuration can be, for example, the one where the device 10 is coupled with the panels of a certain landing door of the elevator equipment. In this use configuration, the shape and movement of the secondary rotor 34, thanks to the contact between the first connecting pin 36 of the secondary rotor 34 and the abutment shaped profile 64, allows the forces exerted on each coupling blade 14, 16 to be discharged onto the base plate 12. Typically, these forces arise from accelerations or decelerations that the device 10 imposes on the landing door panels. The abutment shaped profile 64 therefore determines a useful condition of stability of the device 10 kinematics during the opening and closing movements of the synchronous doors of the elevator equipment.

With reference now to FIGS. 4A to 8B, they schematically show some possible configurations of use of the device 10 when this device 10 is mounted onto the opening and closing mechanism of the cab door of an elevator equipment.

Figure 4A:
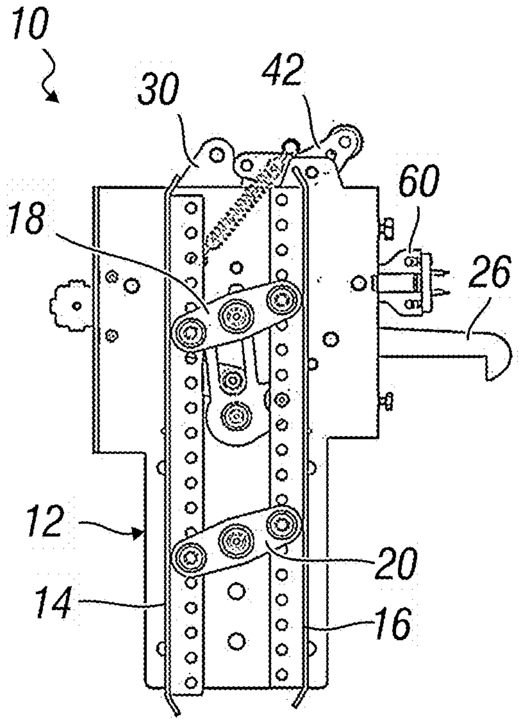
FIGS. 4A and 4B show, from the front side and from the rear side, respectively, a coupling and locking device for synchronous doors of an elevator equipment according to the present invention, in a first, a third and a fifth use configuration.
Figure 4B:
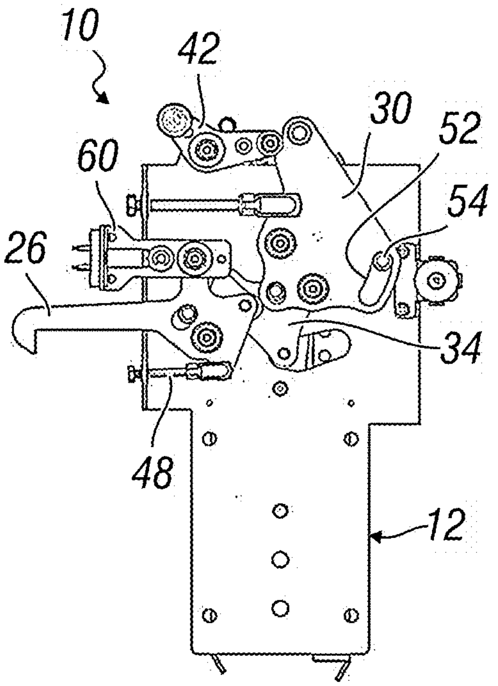

In a first use configuration, shown in FIGS. 4A and 4B, the cab door panels are in the process of closing and a force for opening them is applied to the connecting pin 58. The operation takes place between the floors, that is without the landing rollers which, therefore, do not interact with the coupling blades 14, 16. The primary rotor 30 is blocked by the locking lever 42, which is in the lowered position. The primary rotor 30 is also blocked by the connecting pin 54 against the first limit switch end 56A of the second slot 52. In this first configuration, the primary rotor 30 does not transfer any movement to the secondary rotor 34. Consequently, the secondary rotor 34 does not apply any force to the coupling lever 26, which only remains under the action of the spring 48 which keeps the coupling lever 26 in the lowered position, or in engagement with the respective hook.

Figure 5A:
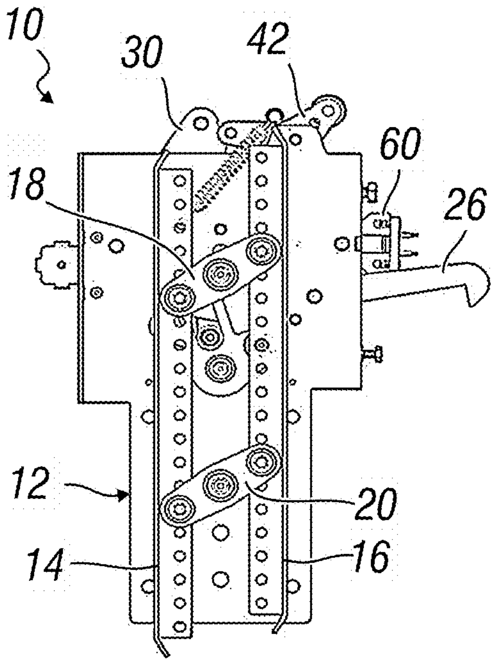
FIGS. 5A and 5B show, from the front side and from the rear side, respectively, the device of FIGS. 4A and 4B, in a second and a fourth use configuration.
Figure 5B:
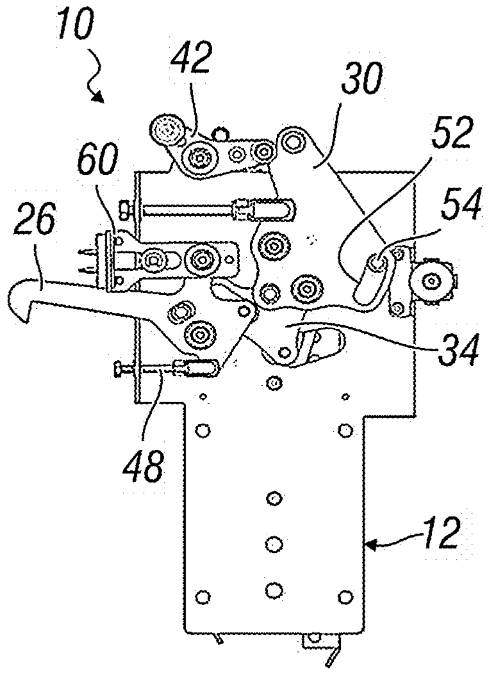
Figure 6A:
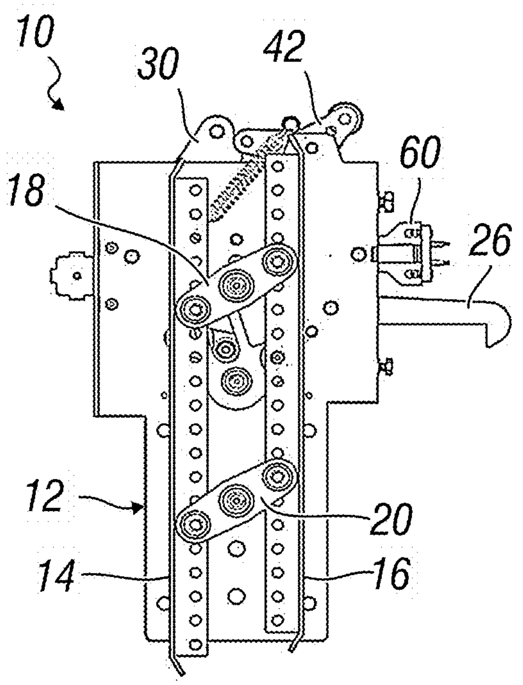
FIGS. 6A and 6B show, from the front side and from the rear side, respectively, the device of FIGS. 4A and 4B, in a sixth use configuration.
Figure 6B:
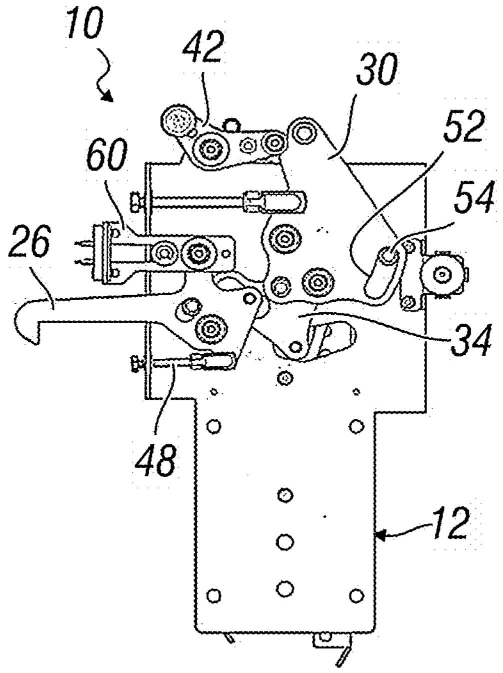

In a second use configuration, shown in FIGS. 5A and 5B, the cab door panels are in the process of closing and a closing force is applied to the connecting pin 58. The primary rotor 30 is blocked by the locking lever 42, which is in the lowered position. The operation takes place at the floor, therefore in the presence of the landing rollers which limit the nominal value of the opening, or distance D, of the coupling blades 14, 16. The position of the first rotating lever 18 determines the position of the first connecting pin 36 of the secondary rotor 34 which, in combination with the locked state of the primary rotor 30, determines the absolute position of the centre of rotation of the secondary rotor 34, consisting of its second connecting pin 38. In this use configuration, the slot 50 of the secondary rotor 34 is not concentric with the fixed pin 32 of the primary rotor 30. Therefore, in this use configuration, the rotation of the secondary rotor 34 alone allows a force to be applied to the hooking lever 26 such as to overcome the counterforce of the spring 48. The hooking lever 26 will therefore be in the raised position, or disengaged from the respective hook.

Again with reference to FIGS. 4A and 4B, a third use configuration is shown. The cab door panels are in the process of opening and a force for opening them is applied to the connecting pin 58. The primary rotor 30 is blocked by the locking lever 42, which is in the lowered position. The primary rotor 30 is also blocked by the connecting pin 54 against the first limit switch end 56A of the second slot 52. The operation takes place between the floors, that is without the landing rollers which, therefore, do not interact with the coupling blades 14, 16. The position of the first rotating lever 18 determines the position of the first connecting pin 36 of the secondary rotor 34 which, in combination with the locked state of the primary rotor 30, determines the absolute position of the centre of rotation of the secondary rotor 34. The primary rotor 30 does not transfer any movement to the secondary rotor 34. In this use configuration, the secondary rotor 34 does not apply any force to the coupling lever 26, which only remains under the action of the spring 48 and, hence, in the lowered position, or in engagement with the respective hook.

Again with reference to FIGS. 5A and 5B, a fourth use configuration is shown. The cab door panels are in the process of opening and a force for opening them is applied to the connecting pin 58. The primary rotor 30 is blocked by the locking lever 42, which is in the lowered position. The primary rotor 30 is also blocked by the connecting pin 54 against the first limit switch end 56A of the second slot 52. The operation takes place at the floor, therefore in the presence of the landing rollers which limit the nominal value of the opening, or distance D, of the coupling blades 14, 16. The position of the first rotating lever 18 determines the position of the first connecting pin 36 of the secondary rotor 34 which, in combination with the locked state of the primary rotor 30, determines the absolute position of the centre of rotation of the secondary rotor 34. In this use configuration, the slot 50 of the secondary rotor 34 is not concentric with the fixed pin 32 of the primary rotor 30. This condition shall ensure that the secondary rotor 34, as it rotates, applies a force to the hooking lever 26. Basically, it is the slot 50 of the secondary rotor 34 that applies a force on the hooking lever 26, which is able to overcome the opposition of the spring 48 and allows the hooking lever 26 to rise, thus disengaging from the respective hook.

Again with reference to FIGS. 4A and 4B, a fifth use configuration is shown. The cab door panels are deadlocked in the open position. No force is applied to the connecting pin 58. The primary rotor 30 is blocked by the locking lever 42, which is in the lowered position. The primary rotor 30 is also blocked by the connecting pin 54 against the first limit switch end 56A of the second slot 52. The operation takes place between the floors, that is without the landing rollers which, therefore, do not interact with the coupling blades 14, 16. The position of the first rotating lever 18 determines the position of the first pin 36 for connection with the secondary rotor 34 which, in combination with the locked state of the primary rotor 30, determines the absolute position of the centre of rotation of the secondary rotor 34. The primary rotor 30 does not transfer any movement to the secondary rotor 34. In this condition, the secondary rotor 34 does not apply any force to the coupling lever 26, which only remains under the action of the spring 48 and, hence, in the lowered position, or in engagement with the respective hook.

In a sixth use configuration, shown in FIGS. 5A and 5B, the cab door panels are deadlocked in the open position. No force is applied to the connecting pin 58. The primary rotor 30 is blocked by the locking lever 42, which is in the lowered position. The primary rotor 30 is also blocked by the connecting pin 54 against the first limit switch end 56A of the second slot 52. The operation takes place at the floor, when the cab door panels are coupled with the panels of a certain landing door, and therefore in the presence of the landing rollers which limit the nominal value of the opening, or distance D, of the coupling blades 14, 16. The position of the first rotating lever 18 determines the position of the first connecting pin 36 of the secondary rotor 34 which, in combination with the locked state of the primary rotor 30, determines the absolute position of the centre of rotation of the secondary rotor 34. In this use configuration, the slot 50 of the secondary rotor 34 is not concentric with the fixed pin 32 of the primary rotor 30. Therefore, in this use configuration the rotation of only the secondary rotor 34 allows a force to be applied to the hooking lever 26, as the profile of the slot 50 exerts a force on the hooking lever 26 such to overcome the opposition of the spring 48. The hooking lever 26 rises, thus disengaging from the respective hook.

Figure 7A:
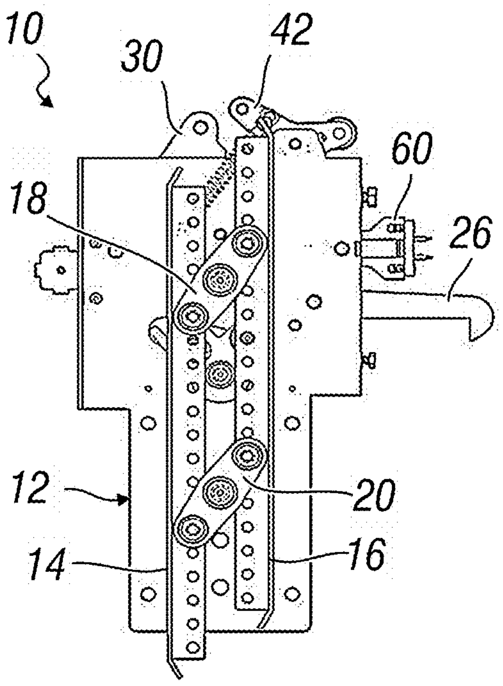
FIGS. 7A and 7B show, from the front side and from the rear side, respectively, the device of FIGS. 4A and 4B, in a seventh and an eighth use configuration.
Figure 7B:
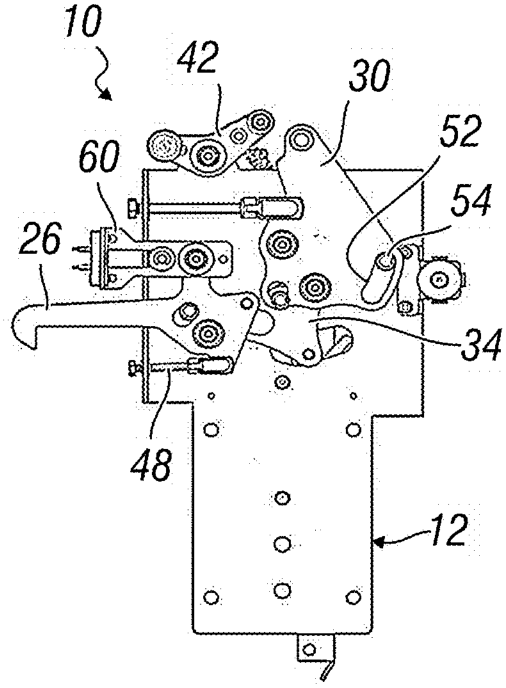

In a seventh use configuration, shown in FIGS. 7A and 7B, the cab door panels are completely closed, and a closing force is applied to the connecting pin 58. This force overcomes the resistance of the spring 48. The operation takes place between the floors. The primary rotor 30 is blocked by the connecting pin 54 against the first limit switch end 56A of the second slot 52. In this use configuration, the slot 50 of the secondary rotor 34 is concentric with the fixed pin 32 of the primary rotor 30. This condition shall ensure that the secondary rotor 34 does not apply any force to the hooking lever 26. In this condition, the coupling lever 26 remains solely under the action of the spring 48 which keeps such hooking lever 26 in the lowered position.

Again with reference to FIGS. 7A and 7B, an eighth use configuration is shown. The cab door panels are completely closed, and a closing force is applied to the connecting pin 58. This force overcomes the resistance of the spring 48. The operation takes place at the floor. The primary rotor 30 is blocked by the connecting pin 54 against the first limit switch end 56A of the second slot 52. In this use configuration, the slot 50 of the secondary rotor 34 is concentric with the fixed pin 32 of the primary rotor 30. This condition shall ensure that the secondary rotor 34 does not apply any force to the hooking lever 26. In this condition, the coupling lever 26 only remains under the action of the spring 48 which keeps such hooking lever 26 in the lowered position.

Figure 8A:
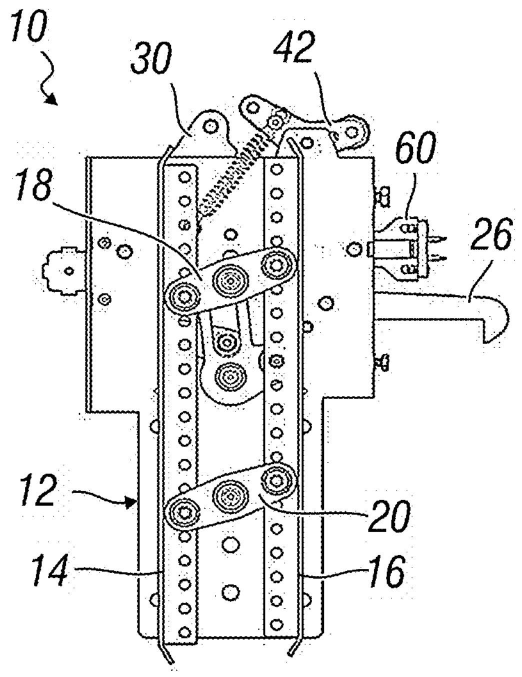
FIGS. 8A and 8B show, from the front side and from the rear side, respectively, the device of FIGS. 4A and 4B, in a ninth use configuration.
Figure 8B:
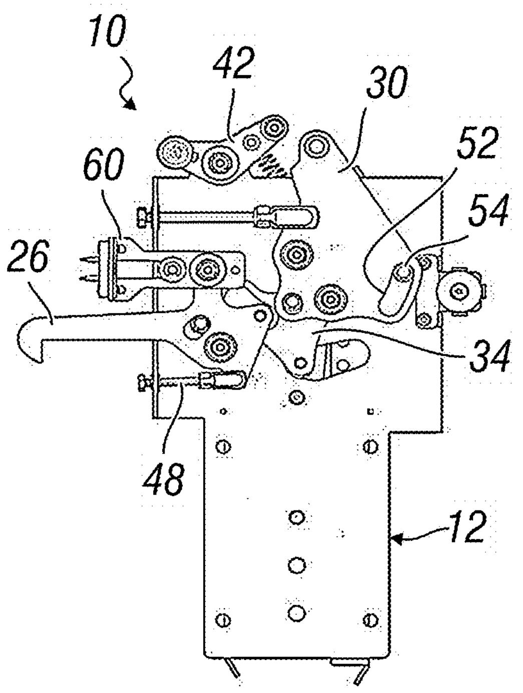

In a ninth use configuration, shown in FIGS. 8A and 8B, the cab door panels are completely closed and a force for opening them is applied to the connecting pin 58. The primary rotor 30 locks with the second limit switch end 56B against the connecting pin 54. The operation takes place between the floors. The position of the first rotating lever 18 determines the position of the first connecting pin 36 of the secondary rotor 34 which, in combination with the locked state of the primary rotor 30, determines the absolute position of the centre of rotation of the secondary rotor 34. The primary rotor 30 does not transfer any movement to the secondary rotor 34. This condition shall ensure that the secondary rotor 34 does not apply any force to the hooking lever 26. In this condition, the coupling lever 26 only remains under the action of the spring 48 which keeps such hooking lever 26 in the lowered position.

In a tenth use configuration, not shown in the Figures, the cab door panels are completely closed and a force for opening them is applied to the connecting pin 58. The operation takes place at the floor. Doors start their opening movement. The coupling blades 14, 16 meet the landing rollers, which resist, thus compressing the coupling blades 14, 16 and reducing the distance D. The position of the first rotating lever 18 determines the position of the first pin 36 for connection with the secondary rotor 34 which, in combination with the locked state of the primary rotor 30, determines the absolute position of the centre of rotation of the secondary rotor 34. In this use configuration, the slot 50 of the secondary rotor 34 is not concentric with the fixed pin 32 of the primary rotor 30. This condition shall ensure that the secondary rotor 34, as it rotates, applies a force to the hooking lever 26, as the profile of the slot 50 exerts a force on the hooking lever 26 such to overcome the opposition of the spring 48. The hooking lever 26 rises, thus disengaging from the respective hook.

Again with reference to FIGS. 8A and 8B, an eleventh use configuration is shown. The cab door panels are completely closed, and no force is applied to the connecting pin 58. The primary rotor 30 is blocked by the connecting pin 54 against the second limit switch end 56B of the second slot 52. The operation takes place between the floors. The position of the first rotating lever 18 determines the position of the first connecting pin 36 of the secondary rotor 34 which, in combination with the locked state of the primary rotor 30, determines the absolute position of the centre of rotation of the secondary rotor 34. The primary rotor 30 does not transfer any movement to the secondary rotor 34. In this condition, the secondary rotor 34 does not apply any force to the hooking lever 26, which only remains under the action of the spring 48 and hence in the lowered position.

In a twelfth and final use configuration, not shown in the Figures, the cab door panels are completely closed, and no force is applied to the connecting pin 58. The primary rotor 30, pushed by the spring 48, is blocked by the connecting pin 54 against the second limit switch end 56B of the second slot 52. The operation takes place at the floor, therefore in the presence of the landing rollers which limit the opening of the coupling blades 14, 16. The position of the first rotating lever 18 determines the position of the first connecting pin 36 of the secondary rotor 34 which, in combination with the locked state of the primary rotor 30, determines the absolute position of the centre of rotation of the secondary rotor 34. In this use configuration, the slot 50 of the secondary rotor 34 is not concentric with the fixed pin 32 of the primary rotor 30. This condition shall ensure that the secondary rotor 34, as it rotates, applies a force to the hooking lever 26, as the profile of the slot 50 exerts a force on the hooking lever 26 such to overcome the opposition of the spring 48. The hooking lever 26 rises, thus disengaging from the respective hook.

It has thus been seen that the coupling and locking device for synchronous doors of an elevator equipment according to the present invention achieves the objects highlighted above. The coupling and locking device for synchronous doors of an elevator equipment of the present invention thus conceived is however susceptible of numerous modifications and variations, all of which falling within the scope of protection of the attached claims; furthermore, all the details can be replaced by technically equivalent elements. In practice, the materials used, as well as the shapes and dimensions, may be any according to the technical requirements. The scope of protection of the invention is therefore defined by the attached claims.

The invention claimed is:

1. A coupling and locking device for synchronous doors of elevator equipment, the device having a plurality of use configurations and comprising:

a base plate having a front surface and a rear surface, wherein the front surface is opposite and parallel relative to the rear surface, and wherein said base plate is configured to be mounted on a portion of a cab of the elevator equipment;

a first coupling blade and a second coupling blade, which are mounted movably on the front surface of the base plate, wherein each coupling blade can be operated is configured for operation by a respective actuator of the elevator equipment to move both along a first direction (A) and along a second direction (B) which is perpendicular relative to the first direction (A), and wherein the movement of the coupling blades along the second direction (B) defines a variation of a mutual distance (D), which is measured along said second direction (B), between said coupling blades;

a first rotating lever and a second rotating lever, which are both rotatable around respective first fixed pins placed on the front surface of the base plate, wherein each rotating lever is hinged to both the first coupling blade and the second coupling blade to form a parallelogram mechanism consisting of said coupling blades and said rotating levers; and at least one hooking lever, which is movable relative to the base plate, wherein said hooking lever is configured to engage with a respective fixed component of the elevator equipment, and wherein said hooking lever is indirectly connected to said first rotating lever by a rotor mechanism, wherein the rotor mechanism comprises:

a primary rotor, which is rotatable around a second fixed pin disposed on the base plate; and a secondary rotor having a first connecting pin for connection with said first rotating lever and a second connecting pin for connection with said primary rotor, wherein a third connecting pin connects said hooking lever with said secondary rotor, in such a way that, in at least one of the use configurations of the device, a variation of the distance (D) between said coupling blades causes a rotation of said hooking lever due to the combined rotation of said primary rotor and said secondary rotor; and wherein the secondary rotor has a first slot in the shape of an arc of a circle, within which the third connecting pin which connects said hooking lever with said secondary rotor is inserted.

2. The device according to claim 1, comprising at least one locking lever which is rotatable around a third fixed pin placed on the base plate, wherein said locking lever configured for operation by a respective actuator of the elevator equipment and has a fourth connecting pin for connection with the primary rotor, in such a way that a rotation of said locking lever causes the selective locking and unlocking of the rotation of said primary rotor.

3. The device according to claim 2, wherein said hooking lever has at least one spring which, when not stressed, is configured to keep said coupling lever in an engagement position with the respective fixed component of the elevator equipment.

4. The device according to claim 2, further comprising a second slot in the shape of an arc of a circle, within which a fifth connecting pin which connects said primary rotor with said base plate is inserted, wherein said second slot comprises a first limit switch end and a second limit switch end, which are opposite to each other, and wherein the movement of said fifth connecting pin within said second slot, between the first limit switch end and the second limit switch end, determines the value of the angle of rotation of said primary rotor.

5. The device according to claim 4, wherein said second slot is in said base plate, whereas said fifth connecting pin is on said primary rotor.

6. The device according to claim 4, wherein said second slot is in said primary rotor, whereas said fifth connecting pin is on said base plate.

7. The device according to claim 4, wherein said primary rotor has at least one sixth connecting pin for connection with a respective actuator of the elevator equipment.

8. The device according to claim 7, further comprising at least one movable connecting element which is configured to engage with a respective connecting element of the elevator equipment, wherein a sixth connecting pin connects said movable connecting element with said hooking lever, in such a way that the rotation of said hooking lever causes a movement of said movable connecting element.

9. The device according to claim 8, wherein said base plate has at least one abutment shaped profile, which is configured to receive in contact the first connecting pin of the secondary rotor in at least one of the use configurations of the device, in such a way that the contact between said first connecting pin and said abutment shaped profile allows forces exerted on each coupling blade to be discharged onto the base plate.

10. The device according to claim 1, wherein said hooking lever is rotatable around a fourth fixed pin disposed on the rear surface of the base plate.

11. The device according to claim 10, wherein at least one of: said first fixed pins, said second fixed pin, said third fixed pin, said fourth fixed pin, said first connecting pin for connection with the first rotating lever, said second connecting pin for connection with the primary rotor, said third connecting pin for connection between the hooking lever and the secondary rotor, and said fourth connecting pin for connection with the primary rotor has a respective rolling bearing.

12. The device according to claim 1, wherein said hooking lever has at least one spring which, when not stressed, is configured to keep said coupling lever in an engagement position with the respective fixed component of the elevator equipment.

13. The device according to claim 1, further comprising a second slot in the shape of an arc of a circle, within which a fifth connecting pin which connects said primary rotor with said base plate is inserted, wherein said second slot comprises a first limit switch end and a second limit switch end, which are opposite to each other, and wherein the movement of said fifth connecting pin within said second slot, between the first limit switch end and the second limit switch end, determines the value of the angle of rotation of said primary rotor.

14. The device according to claim 1, wherein said primary rotor has at least one sixth connecting pin for connection with a respective actuator of the elevator equipment.

15. The device according to claim 1, further comprising at least one movable connecting element which is configured to engage with a respective connecting element of the elevator equipment, wherein a sixth connecting pin connects said movable connecting element with said hooking lever, in such a way that the rotation of said hooking lever causes a movement of said movable connecting element.

16. The device according to claim 1, wherein said base plate has at least one abutment shaped profile, which is configured to receive in contact the first connecting pin of the secondary rotor in at least one of the use configurations of the device, in such a way that the contact between said first connecting pin and said abutment shaped profile allows forces exerted on each coupling blade to be discharged onto the base plate.

* * * * *